United States Patent
Moulsley et al.

(10) Patent No.: US 7,379,434 B2
(45) Date of Patent: May 27, 2008

(54) RADIO COMMUNICATION SYSTEM

(75) Inventors: Timothy J. Moulsley, Caterham (GB); Matthew P. J. Baker, Canterbury (GB); Bernard Hunt, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1053 days.

(21) Appl. No.: 10/252,981

(22) Filed: Sep. 23, 2002

(65) Prior Publication Data

US 2003/0099211 A1   May 29, 2003

(30) Foreign Application Priority Data

Oct. 19, 2001  (GB) .................... 0125175.0
Nov. 5, 2001   (GB) .................... 0126421.7

(51) Int. Cl.
*H04B 7/185*  (2006.01)
*H04B 7/00*   (2006.01)

(52) U.S. Cl. ....................... 370/318; 455/522
(58) Field of Classification Search .............. None
See application file for complete search history.

(56) References Cited

U.S. PATENT DOCUMENTS

| | | | |
|---|---|---|---|
| 4,888,767 A | 12/1989 | Furuya et al. | 370/95.2 |
| 5,517,507 A | 5/1996 | Needham et al. | 371/32 |
| 6,088,457 A * | 7/2000 | Parkinson et al. | 380/270 |
| 6,567,388 B1 * | 5/2003 | Tomcik et al. | 370/335 |
| 6,694,469 B1 * | 2/2004 | Jalali et al. | 714/748 |
| 6,757,537 B1 * | 6/2004 | Choi et al. | 455/438 |
| 6,807,165 B2 * | 10/2004 | Belcea | 370/347 |
| 6,904,021 B2 * | 6/2005 | Belcea | 370/252 |
| 6,993,358 B2 * | 1/2006 | Shiotsu et al. | 455/552.1 |
| 7,076,262 B1 * | 7/2006 | Bhatoolaul et al. | 455/522 |
| 2001/0023189 A1 | 9/2001 | Kajimura | |
| 2001/0046875 A1 * | 11/2001 | Davies | 455/507 |
| 2002/0046379 A1 * | 4/2002 | Miki et al. | 714/749 |
| 2003/0013447 A1 * | 1/2003 | Persson et al. | 455/437 |
| 2003/0235162 A1 * | 12/2003 | Chao et al. | 370/329 |
| 2005/0239491 A1 * | 10/2005 | Feder et al. | 455/522 |

FOREIGN PATENT DOCUMENTS

| | | |
|---|---|---|
| JP | 10013338 A | 1/1998 |
| WO | 9953631 A1 | 10/1999 |
| WO | WO0180477 | 4/2001 |
| WO | 02067618 A1 | 8/2002 |
| WO | 03007530 A2 | 1/2003 |

* cited by examiner

*Primary Examiner*—Kwang Bin Yao
*Assistant Examiner*—Warner Wong
(74) *Attorney, Agent, or Firm*—Paul Im

(57) ABSTRACT

A radio communication system comprises a communication channel for the transmission of data packets from a primary station (100) to a secondary station (110). In response to receipt of a data packet, the secondary station transmits an acknowledgement signal to the primary station indicating the status of the received data packet. The signal is selected from a set of at least two available signal types (for example positive and negative acknowledgements, ACK and NACK), and the power at which it is transmitted depends on the type of the signal.

In one embodiment NACKs are transmitted at a higher power than ACKs, thereby reducing the chance of the primary station misinterpreting a NACK as an ACK. In another embodiment a REVERT signal is used to request retransmission of a previous packet. The REVERT signal may be identical to the NACK signal but transmitted at a higher power.

20 Claims, 2 Drawing Sheets

RADIO COMMUNICATION SYSTEM

The present invention relates to a radio communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other mobile radio systems.

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this requirement in UMTS, a High-Speed Downlink Packet Access (HSDPA) scheme is being developed which may facilitate transfer of packet data to a mobile station at up to 4 Mbps.

A conventional component of a packet data transmission system is an ARQ (Automatic Repeat reQuest) process, for handling data packets received in error. For example, consider downlink packet transmission from a Base Station (BS) to a Mobile Station (MS) in HSDPA. When the MS receives a data packet it determines whether the packet has been corrupted, for example using Cyclic Redundancy Check (CRC) information. It then transmits a codeword to the BS, with a first codeword used as an acknowledgement (ACK), to indicate that the packet was successfully received, and a second codeword used as a negative acknowledgement (NACK), to indicate that the packet was received but corrupted. Since packet transmission is typically intermittent, discontinuous transmission (DTX) is normally employed, so that nothing is transmitted by the MS unless a data packet has been received.

A problem with such an ARQ scheme is that the consequences of errors in the ACK and NACK are significantly different. Normally the BS would re-transmit a packet if a NACK were received. If the BS receives a NACK when a ACK was sent, then the packet is re-transmitted anyway, which only wastes a little system resource. If a NACK is sent, but received as a ACK, then no re-transmission is made. Without special physical layer mechanisms, this situation can only be recovered from by using higher layer processes, which adds delay and is a significant waste of system resources. Hence, the cost of an error in a NACK is much more serious than the cost of an error in a ACK.

In order to optimise system performance, it is desirable to control the relative probabilities of errors in decoding ACKs and NACKs. In one UMTS embodiment this is done by setting different detection thresholds at the BS, which requires the MS to transmit the ACK/NACK codeword with a specific power level (e.g. relative to uplink pilot power). This power level and the detection threshold can therefore be chosen to balance costs of ACK/NACK errors, interference generated by the MS, and battery power used by the MS. With DTX, the situation is a little more complex. However, the BS, as the source of the packet, is aware of when a ACK/NACK should be sent by the MS and it should therefore not normally be necessary to specifically detect the DTX state.

In our co-pending unpublished German patent application 10132577.0 (applicant's reference PHDE 010206) a physical layer mechanism for recovering from the case where the BS misinterprets a NACK as an ACK is disclosed. This mechanism makes use of an additional codeword, REVERT, which informs the BS that the MS has received a transmission of a new packet when it was expecting retransmission of the previous packet. In a variation on this scheme two REVERT codewords are used, to provide in addition a NACK or an ACK in respect of the new packet.

An object of the present invention is to improve the efficiency of a packet data transmission system.

According to a first aspect of the present invention there is provided a radio communication system having a communication channel for the transmission of data packets from a primary station to a secondary station, the secondary station having receiving means for receiving a data packet and acknowledgement means for transmitting a signal to the primary station to indicate the status of a received data packet, which signal is selected from a set of at least two available signal types, wherein the acknowledgement means is arranged to select the power level at which the signal is transmitted depending on its type.

By transmitting different acknowledgement signals at different power levels, the probability of the primary station correctly interpreting signals of different types can be manipulated to improve total system throughput and capacity. In one embodiment negative acknowledgements are transmitted at a higher power level than positive acknowledgements to increase the probability of the primary station retransmitting a data packet when necessary. In another embodiment an additional revert signal type is provided, which requests the primary station to retransmit a data packet initially transmitted prior to the current data packet and which was not correctly received. The revert signal may be identical to the negative acknowledgement signal but transmitted at a higher power level.

According to a second aspect of the present invention there is provided a primary station for use in a radio communication system having a communication channel for the transmission of data packets from the primary station to a secondary station, wherein means are provided for transmitting a data packet to the secondary station and for receiving a signal from the secondary station to indicate the status of a received data packet, which signal is selected from a set of at least two available signal types, and wherein means are provided for determining the type of the received signal depending on its received power level.

According to a third aspect of the present invention there is provided a primary station for use in a radio communication system having a communication channel for the transmission of data packets from the primary station to a secondary station, wherein means are provided for transmitting a data packet to the secondary station and for receiving a signal from the secondary station to indicate the status of a received data packet, which signal is selected from a set of at least two available signal types, and wherein means are provided for signalling to the secondary station an indication of how the power level at which the secondary station transmits the signal depends on the type of the signal.

According to a fourth aspect of the present invention there is provided a secondary station for use in a radio communication system having a communication channel for the transmission of data packets from a primary station to the secondary station, wherein receiving means are provided for receiving a data packet from the primary station and acknowledgement means are provided for transmitting a signal to the primary station to indicate the status of a received data packet, which signal is selected from a set of at least two available signal types, wherein the acknowledgement means is arranged to select the power level at which the signal is transmitted depending on its type.

According to a fifth aspect of the present invention there is provided a method of operating a radio communication system having a communication channel for the transmission of data packets from a primary station to a secondary station, the method comprising the secondary station receiving a data packet and transmitting an acknowledgement signal to the primary station to indicate the status of a received data packet, which signal is selected from a set of at least two available signal types, the method comprising selecting the power level at which the signal is transmitted depending on its type.

Embodiments of the present invention will now be described, by way of example, with reference to the accompanying drawings, wherein.

In the drawings the same reference numerals have been used to indicate corresponding features.

Figure 1:
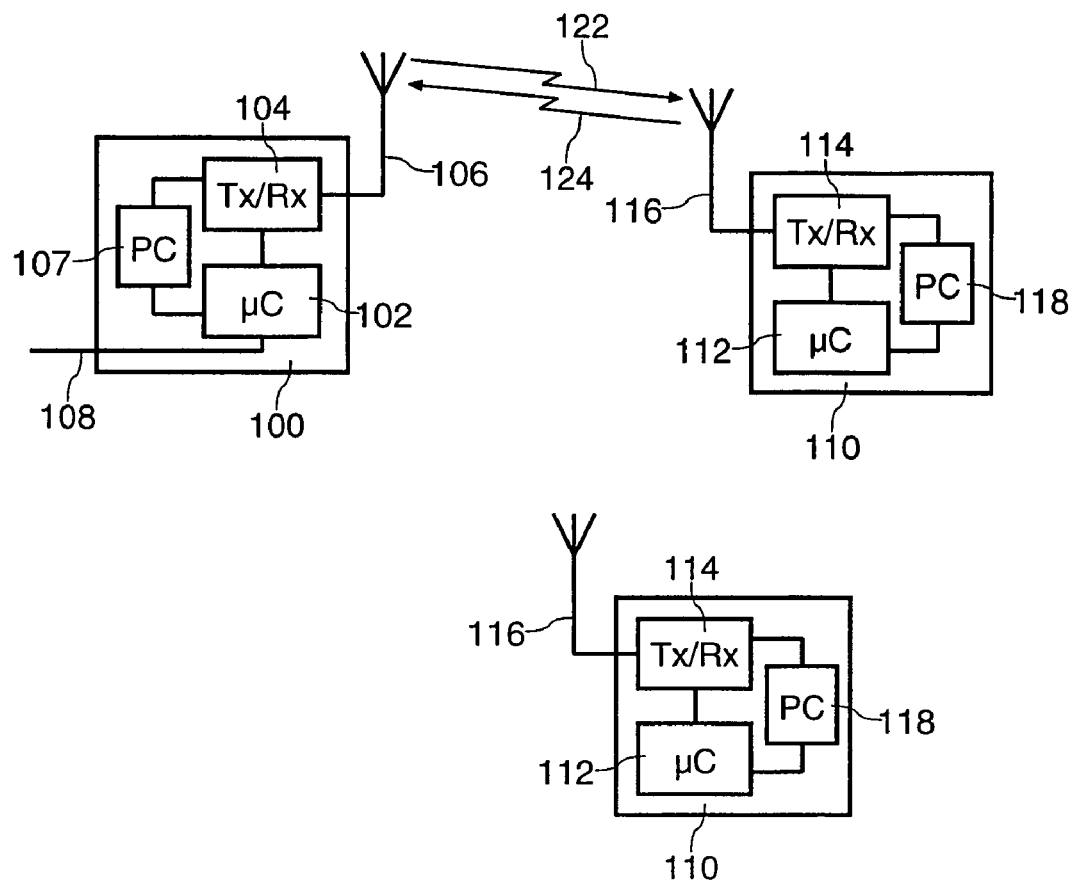
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
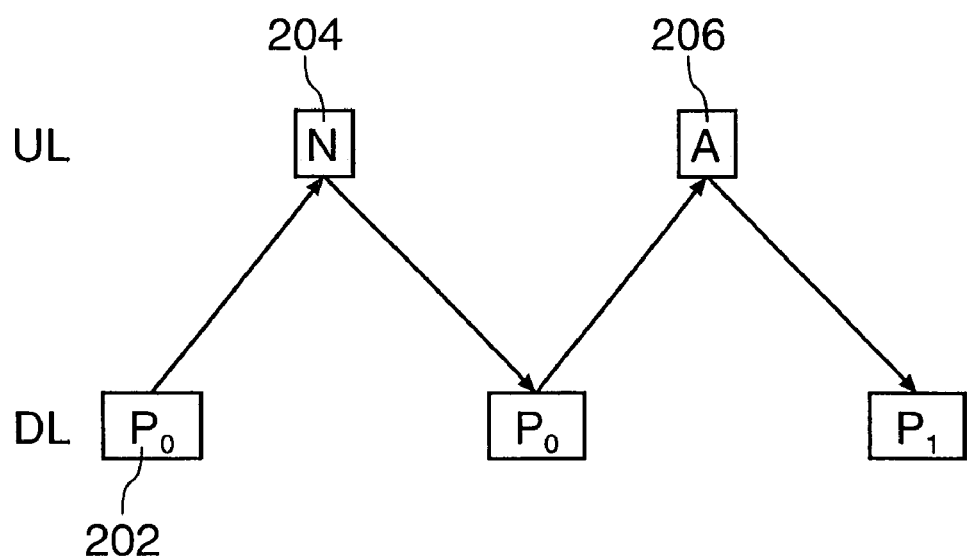
FIG. 2 is a diagram illustrating operation of a known stop-and-wait ARQ scheme.

An example of the operation of a known stop-and-wait ARQ scheme is illustrated in FIG. 2. Data packets 202, identified as $P_n$ where n is a one-bit sequence number, are transmitted on a downlink channel (DL) 122 from a BS 100 to a MS 110. The first data packet $P_0$, with sequence number 0, is received in a corrupted state by the MS 110, which therefore transmits a negative acknowledgement (N) 204. In response to this the BS 100 retransmits the first data packet 202, which this time is received correctly by the MS 100 which transmits an acknowledgement (A) 206. The BS 100 then transmits the next packet, with sequence number 1. The BS 100 also retransmits a data packet 202 if it receives no acknowledgement within a predetermined time-out period (in case the MS 110 did not receive the packet at all or the acknowledgement was lost). If the MS 110 did in fact receive the previously transmitted packet 202 it can determine that the received packet 202 is a retransmission as it has the same sequence number as the previous packet.

Figure 3:
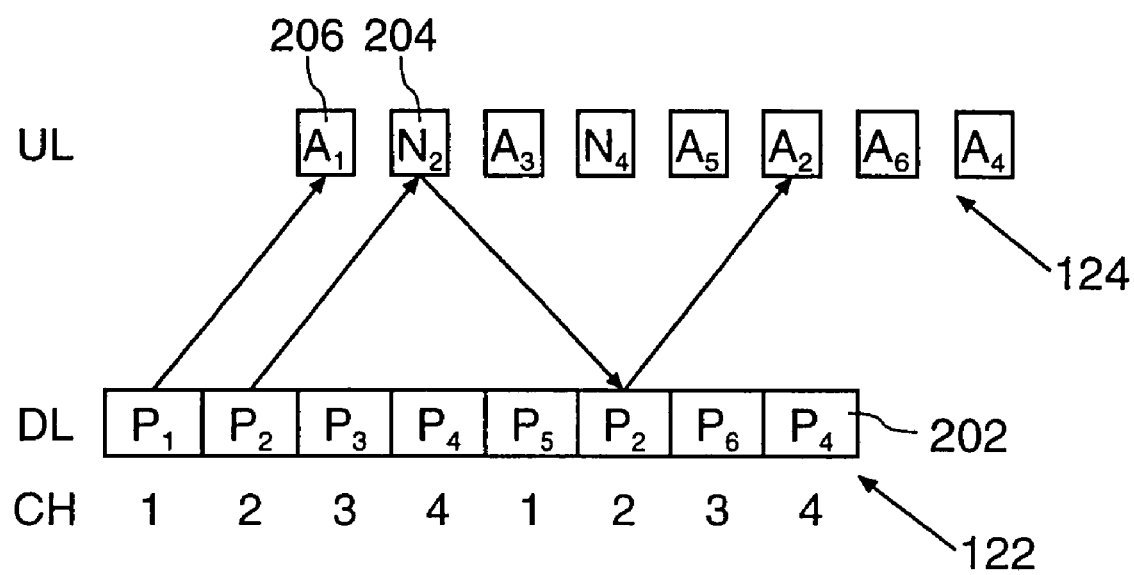
FIG. 3 is a diagram illustrating operation of a known n-channel ARQ scheme.

Improved throughput can be obtained by use of multi-channel ARQ schemes. An example of a 4-channel ARQ scheme operating in known manner is illustrated in FIG. 3. Data packets 202, identified as $P_n$ where n is a sequence number, are transmitted in sequence on a downlink channel (DL) 122 from a BS 100 to a MS 110. Each packet 202 is assigned to a logical channel (CH) in turn, starting with the first packet. Hence, packet $P_1$ is assigned to channel 1, packet $P_2$ to channel 2 and so on. ARQ is performed separately for each channel.

In the illustrated scenario, the first data packet $P_1$ is sent via the first logical channel and is received correctly by the MS 110, which transmits an acknowledgement ($A_1$) 206 on an uplink channel 124. Hence, when channel 1 is next scheduled for transmission, the next packet awaiting transmission, $P_5$ is selected and transmitted to the MS 110. Similarly, the second data packet $P_2$ is sent via the second logical channel. However, this packet is not received correctly by the MS 110, which issues a negative acknowledgement ($N_2$) 204. Hence, when channel 2 is next scheduled for transmission, packet $P_2$ is transmitted again. This time it is correctly received, and an acknowledgement 206 is issued on the uplink channel 124, thereby freeing channel 2 to transmit further packets 202.

As discussed briefly above, the consequences of errors in acknowledgements 204,206 received by the BS 100 are different. If an ACK 206 is received as a NACK 204, the respective packet 202 is retransmitted but the MS 110 can recognise this situation by the sequence number. However, if a NACK 204 is received as an ACK 206, the BS 100 continues with transmission of the next packet 202. The MS 110 can determine that this has happened, from the sequence number of the received packet 202. However, it cannot request the BS 100 to retransmit the packet 202 received in error without invoking higher layer procedures, thereby wasting significant resources.

It is likely for most applications that DTX would be applied for most of the time, given the typically intermittent nature of packet data transmission. In addition, for a well configured system, NACKs 204 should be sent significantly less often than ACKs 206. Hence, in a system made in accordance with the present invention a NACK 204 is transmitted at a higher power level than an ACK 206. This power offset is advantageous because it reduces the error probability for the NACK 204 without increasing the power transmitted for the ACK 206. It is particularly advantageous if the probability of a MS 110 missing a packet is very small, so there is no need to consider optimum setting of BS detection thresholds to differentiate NACK from DTX. Hence, any given error performance targets could be achieved with minimum average power transmitted by the MS 110.

It will be recognised that if a MS 110 is transmitting more NACKs 204 than ACKs 206, this proposed strategy would result in an increase in average uplink interference rather than the desired decrease. Therefore, in one embodiment of the present invention, the MS 110 is forbidden from applying the power offset unless it has previously positively acknowledged more than a certain proportion of packets (e.g. 50%). This prevents the power offset from causing an undue increase in uplink interference in poor downlink channel conditions.

In another embodiment of the present invention, the relative power levels of ACKs 206 and NACKs 204 are modified depending on the proportion of ACKs and NACKs sent. For example, this adaptation could be controlled by a time-weighted average of the proportion of ACKs 206 sent. The detection threshold at the BS 100 could adapted in a similar way based on the proportion of ACKs 206 received. It is apparent that such processes would converge, even in the presence of errors.

In another embodiment of the present invention, instead of being predetermined the ACK/NACK power offset (or maximum offset) could be signalled by the BS 100 depending on the type of service being conveyed to the MS 110 via the data packets 202. For example, in a real-time streaming service with strict timing constraints, a packet which is lost due to a wrongly-detected NACK 204 may simply be ignored by the application if there were not enough time even for a physical layer retransmission. However, for a data service where correct receipt of packets was essential, an ACK/NACK power offset could be signalled. The offset might also be useful in streaming services with slightly less strict timing requirements, where there was insufficient time for a higher-layer retransmission, but a NACK power offset would increase the chance of an erroneous packet being rectified by means of fast physical layer retransmission. It would therefore be beneficial to allow a different offset value to be signalled for each downlink transport channel.

This approach can be further developed by assigning different offset values to the ACK/NACKs for different packets of the same transport channel. For example, in an MPEG stream it is very important to receive the I-frames correctly to avoid errors in subsequent frames. An ACK/NACK power offset could therefore be applied for acknowledgement of packets containing I-frame data while a smaller (or zero) offset is applied for acknowledgement of other packets. Some special signalling could be required, such as a physical layer tag or a particular sequence number on the packets 202, to indicate which packets contained the I-frame data.

In a further development of this approach, other information, such as channel quality, could be signalled by the use of different codewords in the data field reserved for ACK/NACK messages, as disclosed in our co-pending unpublished International patent application IB 02/00330 (applicant's reference PHGB 010069). In general it is likely that there are different costs of errors in detecting the different information possibilities. Therefore, there could be different power levels applied to the transmission of different subsets of codewords. Furthermore, this approach could be combined with design of the codeword distances to reach specified performance targets. As an example, if NACK is 0000, then ACK might be 1110, and sending ACK together with an indication of high channel quality might be 1111.

In one preferred embodiment, particularly suitable for UMTS HSDPA, the ACK/NACK power offset used by the MS 110, as well as the ACK power level would be determined by higher layer signalling from the network. Alternatively, the offset could be signalled using a single information bit, signifying "no offset" (i.e. equal transmit power for ACK 206 and NACK 204) or "use offset", signifying the use of a pre-determined value of power offset. More signalling bits could be used to indicate a larger range of values of offset.

The BS 100 (knowing the power levels used by the MS 110) would use a detection threshold adjusted to optimise system performance (although the BS 100 would not necessarily have to know the power levels used by the MS 110, as a "neutral" threshold could be set based on the received uplink pilot information). An optimised threshold could be set by the Radio Network Controller (RNC) or other means.

The problem of a BS 100 receiving as an ACK 206 an acknowledgement that was sent as a NACK 204, from which the MS 110 cannot recover using physical layer mechanisms, was mentioned above. Our co-pending unpublished German patent application 10132577.0 (applicant's reference PHDE 010206) discloses a physical layer mechanism for recovering from this situation by use of an additional command, REVERT, which informs the BS 100 that the MS 110 has received a transmission of a new packet when it was expecting retransmission of the previous packet. The REVERT command can for example be implemented as one codeword (providing no information on the status of the packet 202 just received) or as two codewords (one additionally providing a NACK in respect of the packet 202 just received, the other providing an ACK). The inclusion of additional signalling parameters, as mentioned above, is also possible.

In such an embodiment, the consequence of a REVERT command being wrongly decoded as "Don't revert" is more serious than the consequence of a NACK or ACK being wrongly decoded as a REVERT command. It would therefore be desirable to decrease the error rate on the REVERT command, without increasing significantly the uplink interference to other users in the system. Hence, in a system made in accordance with the present invention, the REVERT command is transmitted with a higher power than ACK and NACK commands in order to reduce the probability of a REVERT command being wrongly decoded.

A range of variations on this embodiment are envisaged. In a first variation there are three commands to be encoded (together with DTX, i.e. nothing transmitted by the MS 110). These commands are:

| Command | Meaning | Consequences |
|---------|---------|--------------|
| ACK | Expected packet received correctly | Send next packet |
| NACK | Packet received in error | Repeat packet |
| REVERT | Unexpected new packet received when expecting a retransmission | Repeat earlier packet |
| DTX | No packet detected | Send next packet |

In the case of the NACK and REVERT commands the packet which is to be repeated is defined by the timing of packet slots and system round trip delays. At the MS 110, a change in sequence number indicates new data and that the MS should empty its data buffer. Assuming incremental redundancy of some kind (including Chase combining), if the packet in the buffer has not yet been correctly decoded, then this should trigger a REVERT.

In one known embodiment of a stop-and-wait ARQ scheme, ACK and NACK commands are sent as all 1 and all 0 codewords respectively. In such a scheme a REVERT command could be indicated by the same codeword as a NACK command but transmitted with a higher power (say 6 dB higher). In UMTS uplink the power reference for detection would be the pilot bits on a control channel. It would also be possible to send REVERT as a high power ACK, but this would increase the probability of confusing REVERT and ACK which is less desirable.

In embodiments of the present invention, the power level for the ACK/NACK/REVERT codewords can be sent to the MS 110 by higher layer signalling. Some possibilities are:

the power level for the REVERT could be implied by the power for the ACK/NACK (i.e. fixed offset);

the power level for REVERT could be signalled explicitly; and the power levels for ACK, NACK and REVERT could be signalled as independent parameters.

Some possible error events, their result and consequent effect on system capacity are considered in the following table, which assumes no previous errors (other than those leading to a REVERT command. It is assumed that the MS 110 clears its buffer when sending an ACK, as well as when the sequence number changes.

| Sent | Received | Result | Effect |
|---|---|---|---|
| ACK | DTX | extra re-transmission | small capacity loss |
| ACK | NACK | extra re-transmission | small capacity loss |
| ACK | REVERT | extra re-transmission of earlier packet | small capacity loss |
| NACK | DTX | re-transmission | no problem |
| NACK | ACK | go on to next packet | REVERT required |
| NACK | REVERT | extra re-transmission of earlier packet | small capacity loss |
| REVERT | DTX | re-transmission of wrong packet | missed packet |
| REVERT | NACK | re-transmission of wrong packet | missed packet |
| REVERT | ACK | transmission of (wrong) new packet | missed packet |
| DTX | ACK | go on to next packet | missed packet |
| DTX | NACK | re-transmission | no problem |
| DTX | REVERT | extra re-transmission of earlier packet | small capacity loss |

In addition to the effects identified in the table, there may be a problem with some incremental redundancy schemes if the first transmission is not detected by the MS 110.

The selected power levels could be tailored to achieve desired error probabilities for each of the signals. Consider two possible embodiments. In the first, ACK and NACK commands are sent at the same power level, while REVERT is the same codeword as NACK but sent with 6 dB of extra power. The following probabilities are representative:

| Sent | Received | Prob | Received | Prob | Received | Prob |
|---|---|---|---|---|---|---|
| ACK | DTX | 0.01 | NACK | 0.0001 | REVERT | ≈0 |
| NACK | DTX | 0.01 | ACK | 0.0001 | REVERT | 0.01 |
| REVERT | DTX | 0.0001 | NACK | 0.01 | ACK | ≈0 |
| DTX | ACK | 0.01 | NACK | 0.01 | REVERT | 0.0001 |

Assume that 1% of packets are missed and 80% are correctly received. Hence, when a packet is sent by the BS 100 the probability of the MS 110 sending DTX is 0.01, of ACK is 0.8 and of NACK is approximately 0.19. The probability of a REVERT is then approximately 0.19×0.0001=2e−5. The probability of incorrectly received REVERT is therefore 0.00002×0.01=2e−7.

In the second embodiment, DTX and NACK sent with same (zero) power, while REVERT sent as a different codeword to ACK but with the same power. The following probabilities are representative:

| Sent | Received | Prob | Received | Prob |
|---|---|---|---|---|
| ACK | NACK/DTX | 0.01 | REVERT | 0.0001 |
| NACK/DTX | ACK | 0.01 | REVERT | 0.01 |
| REVERT | NACK/DTX | 0.01 | ACK | 0.0001 |

With the same assumptions as before, the probability of NACK/DTX is 0.2 and of ACK is 0.8. Hence, the probability of a REVERT is approximately 0.2×0.01=0.002, and the probability of an incorrectly received REVERT is approximately 0.002×0.01=2e−5.

These results suggest that, in this particular scenario, sending a REVERT using the same codeword as a NACK but with higher power is the best option. It also allows a misinterpreted NACK to be distinguished from misinterpreted DTX.

In a second variation, the REVERT command could be coded together Is with the ACK/NACK command in a single codeword in the ACK/NACK field. A simple bi-orthogonal code could be as follows:

| Message | Codeword |
|---|---|
| ACK | 1111111111 |
| NACK | 0101010101 |
| ACK, REVERT | 1010101010 |
| NACK, REVERT | 0000000000 |
| No packet detected | DTX |

Here, ACK or NACK relate to the packet 202 just received. The two codewords including the REVERT command (i.e. 0101010101 or 1010101010) would be transmitted at a higher power than the other two codewords.

In a third variation an alternative bi-orthogonal code is used, which can be viewed as dividing the ACK/NACK/REVERT field into two parts:

| Message | Codeword |
|---|---|
| ACK | 1111111111 |
| NACK | 0000011111 |

-continued

| Message | Codeword |
|---|---|
| ACK, REVERT | 1111100000 |
| NACK, REVERT | 0000000000 |
| No packet detected | DTX |

Here, one (in this example the first) half of the field is used to signal ACK/NACK and the other half is used to signal Revert/Don't revert. In this case it is not necessary to increase the transmit power in the first half of the field; the transmit power could just be increased in the second part of the field when the command is REVERT. However, in a UMTS embodiment it is probably desirable to keep the power constant throughout the field as the MS 110 may not have the capability to change its transmit power more often than once per timeslot.

If the BS 100 detected DTX (i.e. no reply) when it was expecting a command, it would generally interpret this as a NACK without a REVERT command. This increases the need to use a higher transmit power when the command is REVERT.

In an alternative embodiment, a REVERT/DON'T REVERT command could be transmitted as a separate bit from the one used for the ACK/NACK signalling. This could be in a separate field on the same channel, or on a separate channel defined by a different channelisation code, frequency or timeslot.

In this case, either nothing could be transmitted in the revert field when there is no need for a revert, or a bipolar signal could be transmitted for every packet. If no transmission in the revert field indicated no need for a revert, then a REVERT command would have to be transmitted with four times the power of the ACK/NACK field to give the same error rate. In a system made in accordance with the present invention, the REVERT command would therefore be transmitted with more than four times the power of the ACK/NACK field in order to give a reduced error rate.

If a bipolar signal were transmitted for every packet to indicate REVERT or DON'T REVERT, then according to the present invention the REVERT commands would be transmitted with a higher power than the DON'T REVERT commands. However it is more likely that DTX would be used rather than an explicit DON'T REVERT command, as the command should not be REVERT very often, so transmitting DON'T REVERT for nearly every packet would significantly increase the uplink interference.

In general, the power levels at which the ACK/NACK and/or REVERT commands are transmitted may be adjusted in order to achieve a required level of reliability. These power levels could be controlled by messages sent from the BS 100 to the MS 110. These could specify the power level relative to the pilot bits on the uplink dedicated control channel, or relative to the current power level for the channel quality metric. In the case of the dedicated control channels of one MS 110 being in soft handover with more than one BS 100 the power of the uplink dedicated control channel is not likely to be optimal for all the BSs 100 involved. Therefore, a different power level, preferably higher, may be used for sending the ACK/NACK and/or REVERT commands. This power difference could be fixed, or determined by a message from a BS 100. When the transmission of ACK/NACK and/or REVERT is directed to a particular BS 100, the power level may be further modified to take into account the quality of the radio channel for that transmission. For example, if the best radio link from the active set is being used, the power level may be lower than otherwise.

This invention can be applied to mobile radio (particularly UMTS), cordless and WLAN (Wireless Local Area Network) systems. It is particularly suited to the HSDPA concept, but not limited to it.

The above description is aimed at UMTS FDD (Frequency Division Duplex) mode. The invention could also be applied to TDD (Time Division Duplex) mode. In this case the fact that the uplink and downlink channel use different time slots at the same frequency (i.e. reciprocal channel) could reduce the need for signalling of channel information.

The description above related to the BS 100 performing a variety of roles relating to the present invention. In practice these tasks may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure involved in an embodiment of the present invention.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system having a communication channel for the transmission of data packets from a primary station to a secondary station, the secondary station having receiving means for receiving a data packet and acknowledgement means for transmitting a signal to the primary station to indicate the status of a received data packet, which signal is selected from a set of at least three available signal types, wherein the acknowledgement means is arranged to select one of three power levels at which the signal is transmitted depending on its type, with each one of the three power levels associated with a different one of the three available signal types.

2. A system as claimed in claim 1, wherein the available signal types include signals indicating positive and negative acknowledgements.

3. A radio communication system having a communication channel for the transmission of data packets from a primary station to a secondary station, the secondary station having receiving means for receiving a data packet and acknowledgement means for transmitting a signal to the primary station to indicate the status of a received data packet, which signal is selected from a set of at least three available signal types, wherein the acknowledgement means is arranged to select one of three power levels at which the signal is transmitted depending on its type, with each one of the three power levels associated with a different one of the three available signal types,
  wherein the available signal types further include a revert signal that is different than other available signal types and indicates a request for retransmission of a packet received before the packet just received.

4. A system as claimed in claim 3, wherein the revert signal is identical to the negative acknowledgement signal but is transmitted at a higher power.

5. A primary station for use in a radio communication system having a communication channel for the transmission of data packets from the primary station to a secondary station, wherein means are provided for transmitting a data packet to the secondary station and for receiving a signal from the secondary station to indicate the status of a received data packet, which signal is selected from a set of at least three available signal types, and wherein means are provided for determining the type of the received signal depending on one of three power levels received, with each one of the three power levels associated with a different one of the three available signal types.

6. A primary station for use in a radio communication system having a communication channel for the transmission of data packets from the primary station to a secondary station, wherein means are provided for transmitting a data packet to the secondary station and for receiving a signal from the secondary station to indicate the status of a received data packet, which signal is selected from a set of at least three available signal types, and wherein means are provided for signaling to the secondary station an indication of how each of three power levels at which the secondary station transmits the signal depends on the type of the signal, with each one of the three power levels associated with a different one of the three available signal types.

7. A primary station as claimed in claim 6, wherein means are provided for determining the type of the received signal depending on its received power level.

8. A primary station as claimed in claim 6, wherein the indication informs the secondary station of the transmission power that it should use for at least one of the available signal types.

9. A primary station as claimed in claim 6, wherein the indication informs the secondary station of a required power difference between at least two different types of signals.

10. A secondary station for use in a radio communication system having a communication channel for the transmission of data packets from a primary station to the secondary station, wherein receiving means are provided for receiving a data packet from the primary station and acknowledgement means are provided for transmitting a signal to the primary station to indicate the status of a received data packet, which signal is selected from a set of at least three available signal types, wherein the acknowledgement means is arranged to select one of three power levels at which the signal is transmitted depending on its type, with each one of the three power levels associated with a different one of the three available signal types.

11. A secondary station as claimed in claim 10, wherein the signal types include signals indicating positive and negative acknowledgements and in that the acknowledgement means transmits negative acknowledgements at a higher power than positive acknowledgements.

12. A secondary station as claimed in claim 11, wherein means are provided for determining the power difference between acknowledgements with reference to a time-averaged ratio of different signal types transmitted.

13. A secondary station as claimed in claim 12, wherein the acknowledgement means only transmits negative acknowledgements at a higher power than positive acknowledgements if a time-averaged ratio of positive acknowledgements to negative acknowledgements is greater than a predetermined value.

14. A secondary station as claimed in claim 10, wherein the available signal types include signals conveying information relating to prevailing radio conditions other that the status of the received data packet.

15. A method of operating a radio communication system having a communication channel for the transmission of data packets from a primary station to a secondary station, the method comprising the secondary station receiving a data packet and transmitting an acknowledgement signal to the primary station to indicate the status of a received data packet, which signal is selected from a set of at least three available signal types, the method comprising selecting one of three power levels at which the signal is transmitted depending on its type, with each one of the three power levels associated with a different one of the three available signal types.

16. The system of claim 1, wherein the signal is a bi-orthogonal code.

17. The system of claim 16, wherein at least some portion of the signal indicates at least one of a positive and a negative acknowledgement, and at least some portion of the signal indicates a revert.

18. The system of claim 17, wherein a transmit power is increased for the portion of the signal indicating the revert.

19. The system of claim 3, wherein the revert signal is transmitted with at least four times the power of at least one of the positive and negative acknowledgement signals.

20. The system of claim 1, wherein the available signal types include signals indicating positive and negative acknowledgements, wherein a third signal is transmitted with at least four times the power of at least one of the positive and negative acknowledgement signals.

* * * * *